(12) United States Patent
Kumar

(10) Patent No.: US 12,045,519 B2
(45) Date of Patent: Jul. 23, 2024

(54) EMAIL-BASED PRINT JOB STATUS DISPLAY

(71) Applicant: Hewlett-Packard Development Company, L.P., Spring, TX (US)

(72) Inventor: Amrendra Kumar, Bangalore (IN)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/023,369

(22) PCT Filed: Jun. 25, 2021

(86) PCT No.: PCT/US2021/070775
§ 371 (c)(1),
(2) Date: Feb. 26, 2023

(87) PCT Pub. No.: WO2022/067277
PCT Pub. Date: Mar. 31, 2022

(65) Prior Publication Data
US 2023/0315352 A1   Oct. 5, 2023

(30) Foreign Application Priority Data
Sep. 25, 2020   (IN) .............................. 202041041796

(51) Int. Cl.
*G06F 3/12* (2006.01)
(52) U.S. Cl.
CPC .......... *G06F 3/1207* (2013.01); *G06F 3/1259* (2013.01); *G06F 3/1288* (2013.01)
(58) Field of Classification Search
None
See application file for complete search history.

(56) References Cited

U.S. PATENT DOCUMENTS

| 7,258,498 | B2 | 8/2007 | Hatta et al. | |
| 7,986,421 | B2 | 7/2011 | Chen et al. | |
| 8,373,879 | B1 | 2/2013 | Blackman et al. | |
| 9,007,621 | B2 | 4/2015 | Gilmore et al. | |
| 2003/0182378 | A1* | 9/2003 | Treptow | H04L 67/02 709/206 |
| 2006/0047639 | A1* | 3/2006 | King | G06F 16/41 |
| 2007/0234399 | A1* | 10/2007 | Yamazaki | G06F 21/10 725/153 |
| 2008/0240826 | A1 | 10/2008 | Shen | |
| 2008/0306902 | A1 | 12/2008 | Gava et al. | |
| 2015/0169262 | A1 | 6/2015 | Kamppari et al. | |

* cited by examiner

*Primary Examiner* — Andrew H Lam
(74) *Attorney, Agent, or Firm* — Michael Dryja

(57) ABSTRACT

In an example, a non-transitory computer-readable storage medium encoded with instructions that, when executed by a processor of a computing device, may cause the processor to transmit an email message addressed to an email address associated with an image forming apparatus. Example email message may include content to be printed. Further, instructions may cause the processor to receive a confirmation email message from an email print server in response to the transmission of the email message. Example confirmation email message may include a status update mechanism. Furthermore, instructions may cause the processor to execute the status update mechanism. Example status update mechanism may fetch a print job status indicating a progress of printing the content from the email print server and display the fetched print job status in the confirmation email message.

15 Claims, 7 Drawing Sheets

EMAIL-BASED PRINT JOB STATUS DISPLAY

BACKGROUND

Image forming apparatuses, such as network printers, multi-functional peripherals, or the like, may be connected to a network and include an email print function to facilitate email-based printing of documents. The email print function may allow a user to print a document by emailing the document to an email address associated with an image forming apparatus. For example, when a document is emailed to an email address of an image forming apparatus, a print server may receive the email and process the email to determine the image forming apparatus corresponding to the email address. Further, the print server may send the email to the image forming apparatus for printing the document. Thus, the email print function may enable users of an organization to print documents using image forming apparatuses located at different locations of the organization without a printer setup process.

BRIEF DESCRIPTION OF THE DRAWINGS

Examples are described in the following detailed description and in reference to the drawings, in which.

DETAILED DESCRIPTION

Figure 1A:
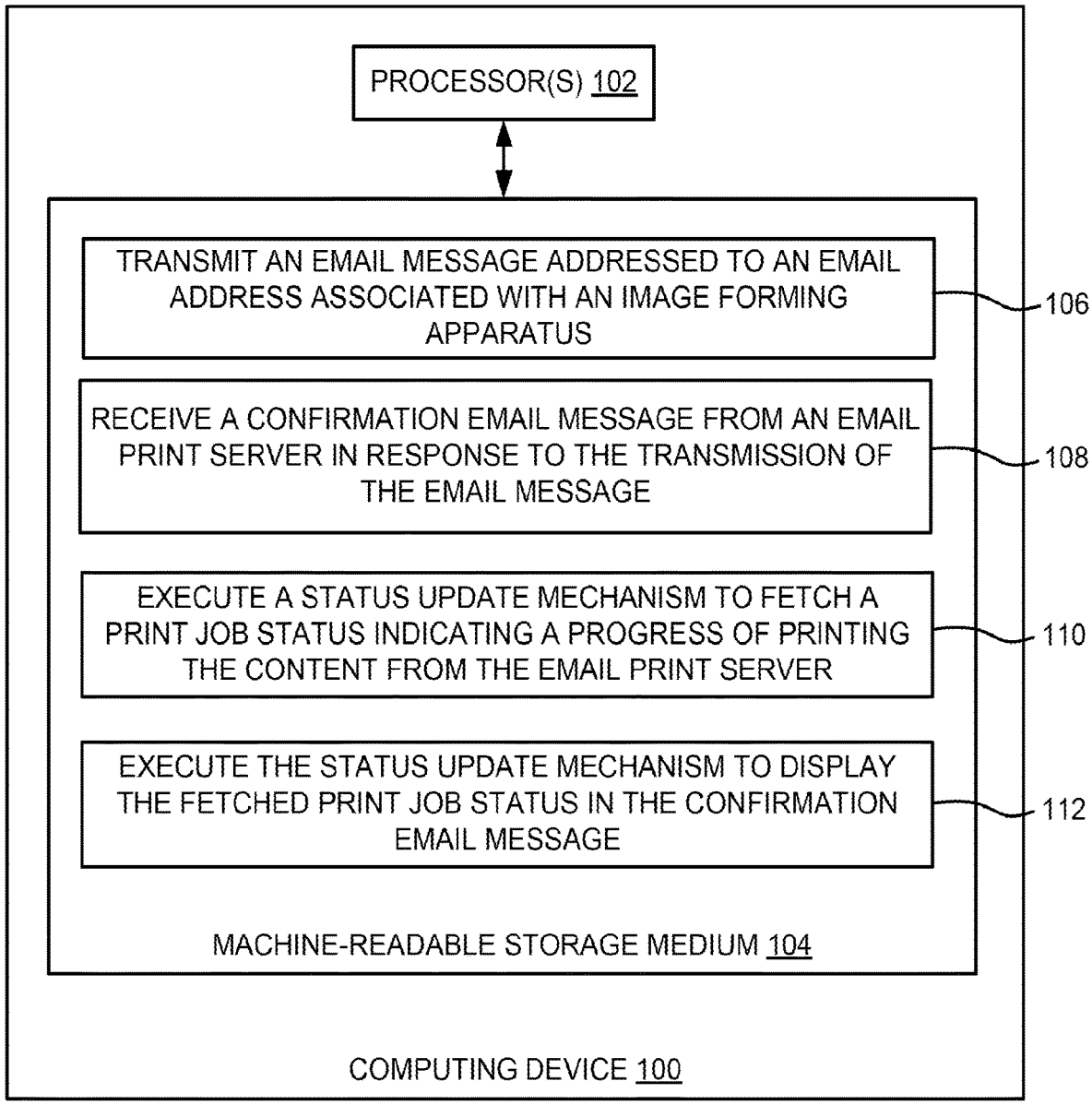
FIG. 1A is a block diagram of an example computing device including non-transitory machine-readable storage medium storing instructions to display a print job status in a confirmation email message.

Image forming apparatuses may include an email print function to facilitate email-based printing of print jobs. With the email print function, a user may print a document by emailing the document to an image forming apparatus. Thus, the email print function may provide a way for an organization to print from the image forming apparatus without a printer setup process (e.g., installing drivers, and the like).

In email-based printing, the user may send a document as an attachment in an email to an email address of the image forming apparatus. Upon sending the email, the user may receive an automated confirmation email from an email print server affirming that the document is received and may be printed. In some examples, the printing of the document may not be successful due to various factors such as the image forming apparatus may be switched off, offline, or the like. In other examples, the image forming apparatus may not start printing of the document or delay the printing of the document due to various reasons such as network issue, pending print jobs, or the like. In such cases, the user may check a working status of the image forming apparatus, and then resend the document again using email. This may sometimes result in printing multiple copies of the document.

In such email-based printing scenarios, the user may be unaware of a real-time printing status, which may lead to not receiving the printed documents on time, unattended documents on the image forming apparatus, or the like. In some examples, the user may be able to check the printing status via a portal of a service provider of the email print server. However, an access to such service or functionality may be limited to an owner or an administrator of the image forming apparatus and may not necessarily be available to each user in the organization.

Examples described herein may provide an email printing service that enables a user to track a real-time print job status via a confirmation/reply email message. In an example, an email message addressed to an email address of an image forming apparatus may be transmitted. The email message may include content to be printed (e.g., as an attachment). Further, a confirmation email message may be received from an email print server in response to the transmission of the email message. Example confirmation email message may include a status update mechanism. Furthermore, the status update mechanism may be executed to fetch a print job status indicating a progress of printing the content from the email print server and display the fetched print job status in the confirmation email message. Thus, examples described herein may provide a real-time print job status in email-based printing systems to track the progress of a print job via the automated confirmation email message, which keeps the user informed about the print job.

In the following description, for purposes of explanation, numerous specific details are set forth in order to provide a thorough understanding of the present techniques. However, the example apparatuses, devices, and systems, may be practiced without these specific details. Reference in the specification to "an example" or similar language means that a particular feature, structure, or characteristic described may be included in at least that one example but may not be in other examples.

Turning now to the figures, FIG. 1A is a block diagram of an example computing device 100 including non-transitory machine-readable storage medium 104 storing instructions (e.g., 106 to 112) to display a print job status in a confirmation email message. Computing device 100 may include a processor 102 and machine-readable storage medium 104 communicatively coupled through a system bus. Processor 102 may be any type of central processing unit (CPU), microprocessor, or processing logic that interprets and executes machine-readable instructions stored in machine-readable storage medium 104.

Machine-readable storage medium 104 may be a random-access memory (RAM) or another type of dynamic storage device that may store information and machine-readable instructions that may be executed by processor 102. For example, machine-readable storage medium 104 may be synchronous DRAM (SDRAM), double data rate (DDR), rambus DRAM (RDRAM), rambus RAM, etc., or storage memory media such as a floppy disk, a hard disk, a CD-ROM, a DVD, a pen drive, and the like. In an example, machine-readable storage medium 104 may be non-transitory machine-readable medium. Machine-readable storage medium 104 may be remote but accessible to computing device 100.

As shown in FIG. 1A, machine-readable storage medium 104 may store instructions 106-112. In an example, instructions 106-112 may be executed by processor 102 to display a print job status in a confirmation email message. Instructions 106 may be executed by processor 102 to transmit an email message addressed to an email address associated with an image forming apparatus. In an example, the email message may include content to be printed. The content may include text data, image data, or a combination thereof. For example, the content may include word processor documents, spreadsheets, portable document format (PDF) files, images, and/or other printable documents. In an example, the content to be printed may be included as an attachment in the email message. In another example, the content may be included in a body of the email message.

Instructions 108 may be executed by processor 102 to receive a confirmation email message from an email print server in response to the transmission of the email message. In an example, the confirmation email message may include a status update mechanism. For example, the status update mechanism may be implemented using a script that is embedded in the email message. Example script may be Javascript. In some examples, the script may be written in scripting language such as Asynchronous JavaScript and XML (AJAX), Flash® Actionscript, or Silverlight®. In other examples, the script may be written in a coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some other example, the script may be written in a database query language such as Structured Query Language (SQL).

Figure 1B:
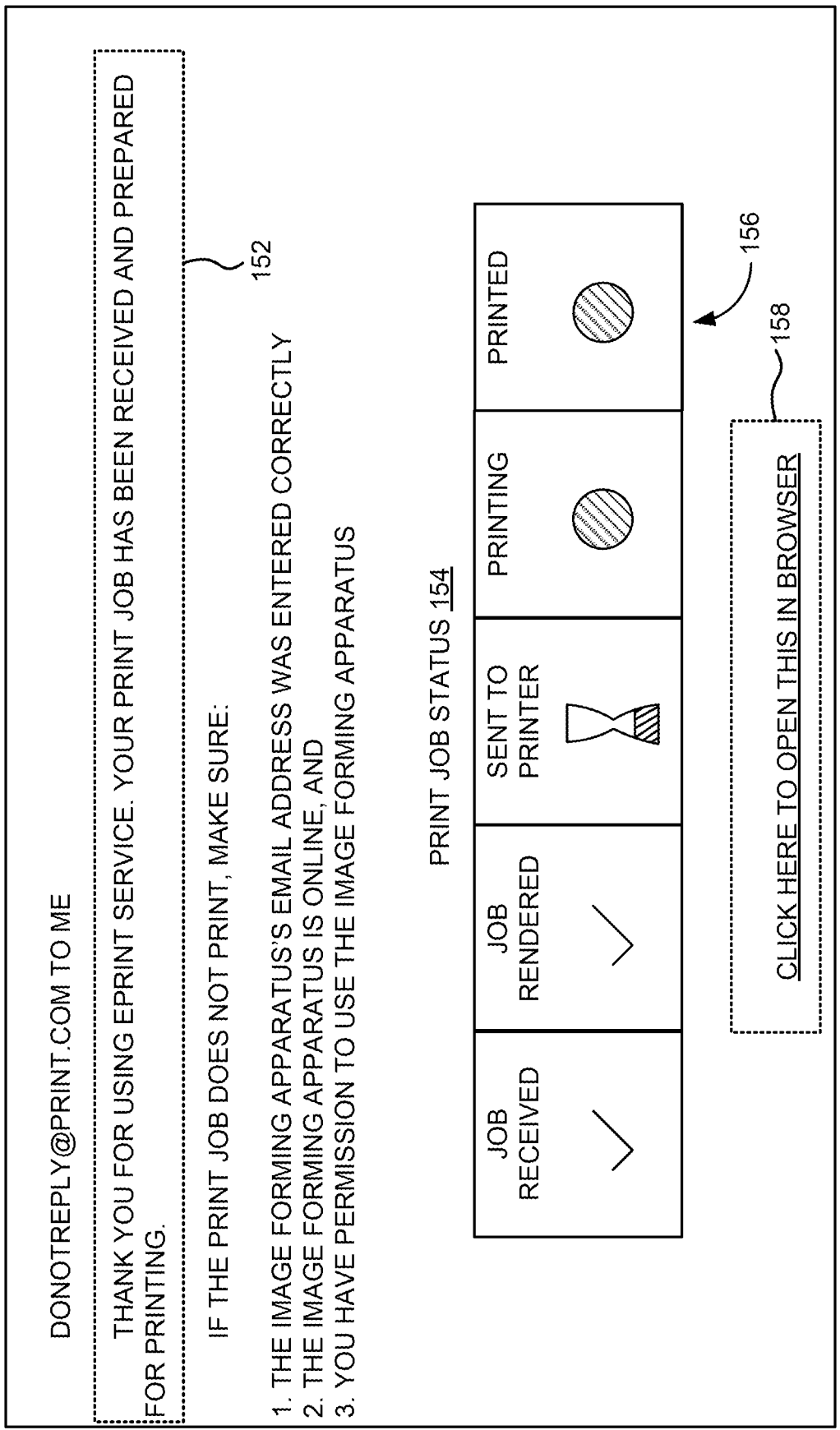
FIG. 1B illustrates an example confirmation email message, depicting a print job status.

Instructions 110 may be executed by processor 102 to execute the status update mechanism to fetch a print job status indicating a progress of printing the content from the email print server. Further, instructions 112 may be executed by processor 102 to execute the status update mechanism to display the fetched print job status in the confirmation email message. Example confirmation email message is depicted in FIG. 1B.

In an example, instructions to execute the status update mechanism may include instructions to:
  connect to a reference link in the email print server to fetch the print job status indicating a state of progress of printing the content, and
  sequentially update an email body of the email message with the fetched print job status until a completion of printing of the content.

In other examples, the confirmation email message may include a hyperlink corresponding to a webpage that is to be displayed in a web browser upon activating the hyperlink. The webpage may display the fetched print job status. Example webpage is depicted in FIG. 2B.

The term "image forming apparatus" may refer to a device that may encompass an apparatus that accepts a request (i.e., a print job) for printing the content via an email message and performs print. The image forming apparatus may be a single function peripheral (SFP) or a multi-function peripheral (MFP). Example image forming apparatus can be a laser beam printer (e.g., using an electrophotographic method for printing), an ink jet printer (e.g., using an ink jet method for printing), or the like.

FIG. 1B illustrates an example confirmation email message 150, depicting a print job status 154. Example confirmation email message 150 may be received from an email print server in response to a transmission of an email message (e.g., a print job) to an image forming apparatus (e.g., via the email print server) for printing content. As shown in FIG. 1B, confirmation email message 150 may indicate a confirmation of reception of the email message for printing the content (e.g., 152).

Further, confirmation email message 150 may include print job status 154 indicating a progress of printing the content. Example print job status 154 may be depicted using a set of status indicators 156. Example status indicators may depict a different state corresponding to the progress of printing the content such as "print job received", "print job rendered", "print job sent to an image forming apparatus", "printing", "printed", and the like. In an example, confirmation email message 150 may be embedded with a status update mechanism, which may be executed to fetch a real-time print job status. Example real-time print job status may sequentially highlight set of status indicators 156 based on the progress of printing of the content.

In the example shown in FIG. 1B, print job status 154 depicts that the print job is received and rendered via highlighting (e.g., check marking) the status indicators "print job received" and "print job rendered". Further, the status indicator "sent to the image forming apparatus" can be highlighted once the status update mechanism fetches the corresponding status from the email print server. Even though FIG. 1B utilizes status indicators 156 to depict print job status 154, other mechanisms such as a progress bar, a status message, or the like can be used to depict print job status 154.

In another example, print job status 154 may also depict a status of the image forming apparatus, an unsupported file type, help content, a print error, and/or the like. For example, print job status 154 may include different graphical icons to represent the status of the image forming apparatus, an occurrence of the print error, or the like. Furthermore, example confirmation email message 150 may include a hyperlink 158 to display print job status 154 on a webpage upon activating hyperlink 158 (e.g., by clicking on hyperlink 158). Example webpage is depicted in FIG. 2B.

Figure 2A:
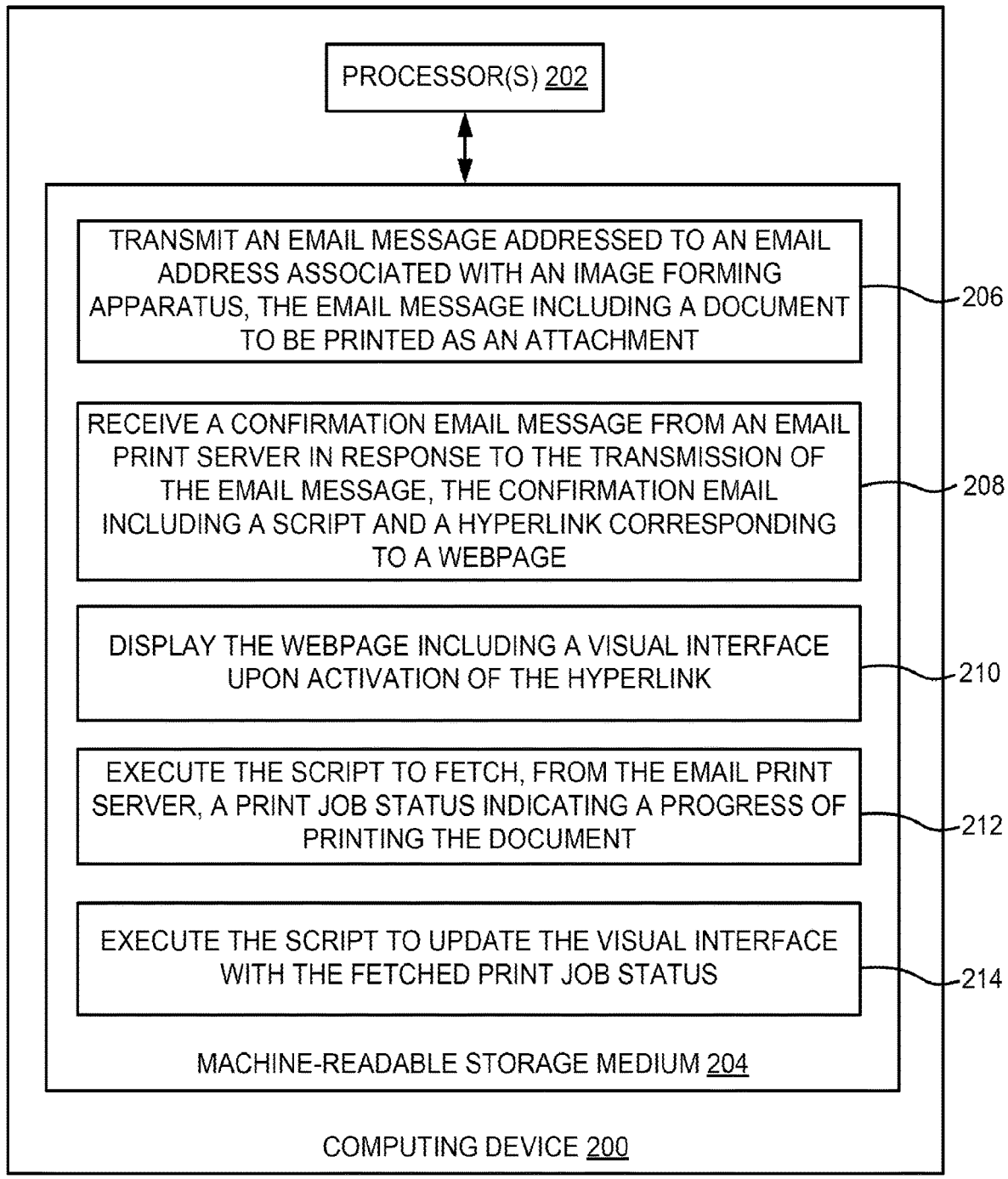
FIG. 2A is a block diagram of an example computing device including non-transitory machine-readable storage medium storing instructions to display a print job status in a visual interface of a webpage.
Figure 2B:
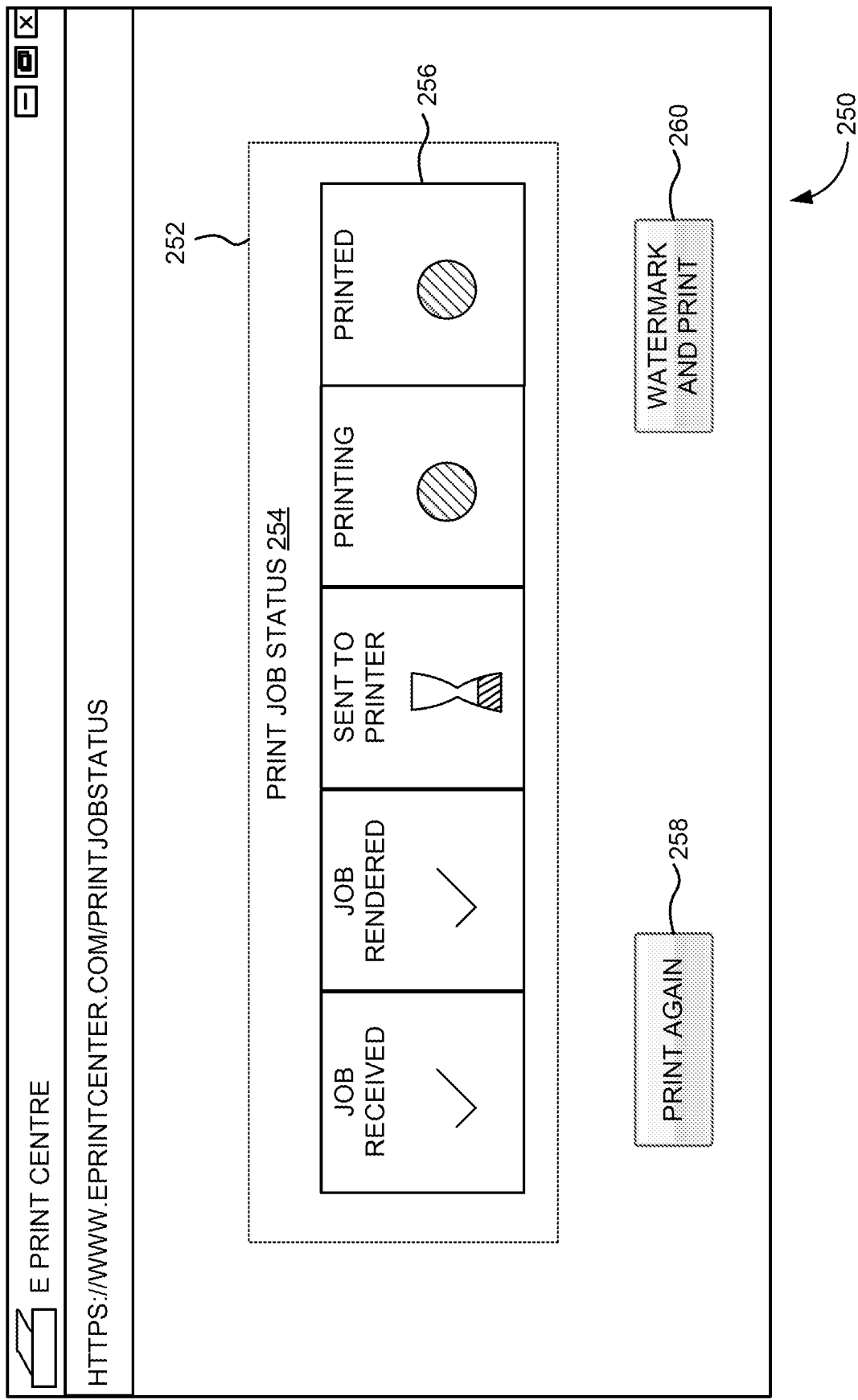
FIG. 2B illustrates an example webpage, depicting a visual interface to display a print job status.

FIG. 2A is a block diagram of an example computing device 200 including non-transitory machine-readable storage medium 204 storing instructions (e.g., 206 to 214) to display a print job status in a visual interface of a webpage. Computing device 200 may include a processor 202 and machine-readable storage medium 204 communicatively coupled through a system bus. Processor 202 may be any type of central processing unit (CPU), microprocessor, or processing logic that interprets and executes machine-readable instructions stored in machine-readable storage medium 204.

Machine-readable storage medium 204 may be a random-access memory (RAM) or another type of dynamic storage device that may store information and machine-readable instructions that may be executed by processor 202. For example, machine-readable storage medium 204 may be synchronous DRAM (SDRAM), double data rate (DDR), rambus DRAM (RDRAM), rambus RAM, etc., or storage memory media such as a floppy disk, a hard disk, a CD-ROM, a DVD, a pen drive, and the like. In an example, machine-readable storage medium 204 may be non-transitory machine-readable medium. Machine-readable storage medium 204 may be remote but accessible to computing device 200.

As shown in FIG. 2A, machine-readable storage medium 204 may store instructions 206-214. In an example, instructions 206-214 may be executed by processor 202 to display a print job status in a visual interface of a webpage. Instructions 206 may be executed by processor 202 to transmit an email message addressed to an email address associated with an image forming apparatus. In an example, the email message may include a document to be printed as an attachment.

Instructions 208 may be executed by processor 202 to receive a confirmation email message from an email print server in response to the transmission of the email message. In an example, the confirmation email may include a script and a hyperlink corresponding to a webpage.

Instructions 210 may be executed by processor 202 to display the webpage including a visual interface upon activation of the hyperlink. In an example, the visual interface may include a set of status indicators. Further, each status indicator may indicate a different state corresponding to the progress of printing the document.

Instructions 212 may be executed by processor 202 to execute the script to fetch a print job status indicating a progress of printing the document from the email print server. The script may be used to interact with the email print server. The script can retrieve data (e.g., the print job status) from a URL in the email print server without having to do a page refresh. This enables a webpage to update a part of the page (i.e., the visual interface). Example script may be an Asynchronous JavaScript and XML (AJAX) script. For example, AJAX may be a group of interrelated web development techniques used for creating interactive web applications or rich Internet applications. With AJAX, the web applications may retrieve data from the email print server asynchronously in the background without interfering with the display and behavior of an existing page. Further, the data may be retrieved using XMLHttpRequest (XHR) objects or through the use of remote scripting in browsers.

Instructions 214 may be executed by processor 202 to execute the script to update the visual interface with the fetched print job status. In an example, instructions to update the visual interface with the fetched print job status may include instructions to sequentially highlight the set of status indicators based on the progress of printing of the document. In an example, instructions to execute the script may include instructions to connect to a reference link (e.g., Uniform Resource Locator (URL)) in the email print server to fetch the print job status. Example reference link may be in an active state until a completion of printing of the document.

FIG. 2B illustrates an example webpage 250, depicting a visual interface 252 to display a print job status 254. In an example, visual interface 252 may include a set of status indicators 256. Each status indicator may indicate a different state corresponding to the progress of printing a document. The set of status indicators 256 may be sequentially highlighted based on the progress of printing of the document as described in FIG. 1B.

Further, webpage 250 may provide a first option 258 to initiate a reprint of the document on an image forming apparatus. For example, when option 258 is selected, reprinting of the same document on the same image forming apparatus may be initiated. Further, webpage 250 may provide a second option 260 to watermark the document and reprint the watermarked document on the image forming apparatus. For example, when option 260 is selected, the document may be watermarked and printed on the same image forming apparatus. In both the cases, the hyperlink may be active with no expiry time.

Figure 3:
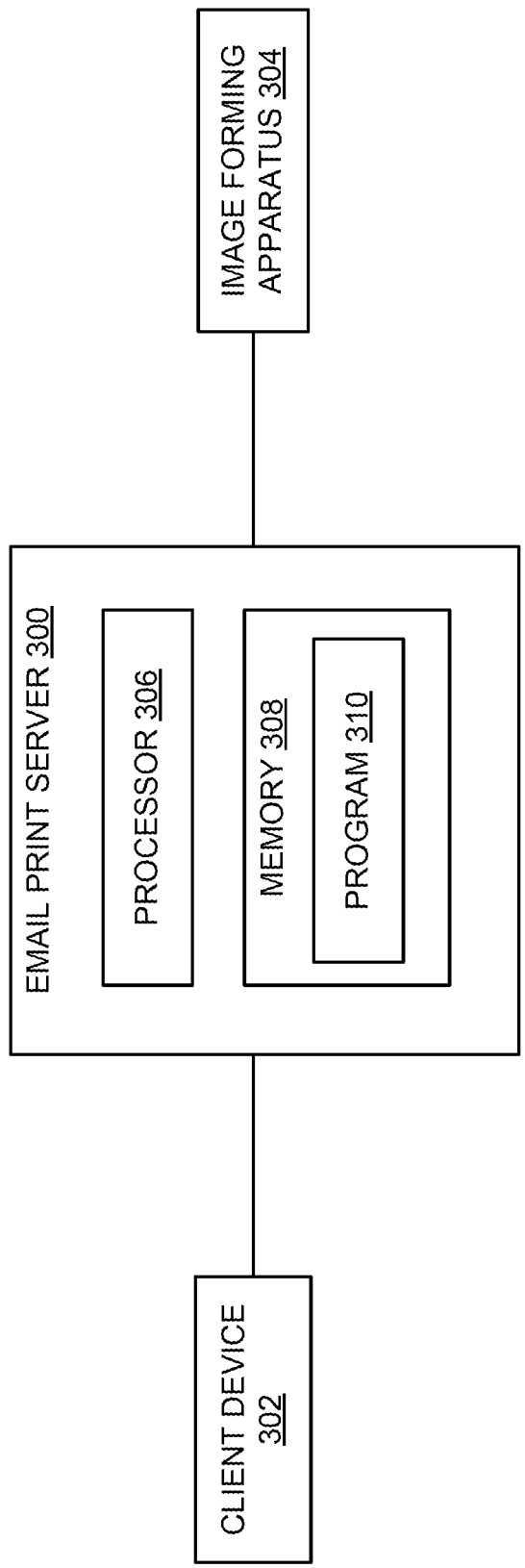
FIG. 3 is a block diagram of an example email print server, including a program to enable an embedded script in a reply email message to continuously fetch a status of a print job.

FIG. 3 is a block diagram of an example email print server 300, including a program 310 to enable an embedded script in a reply email message to continuously fetch a status of a print job. As shown in FIG. 3, email print server 300 may be communicatively connected to a client device 302 and an image forming apparatus 304 via a network. Example network may be a local area network (LAN), a wide area network (WAN), the Internet, and/or the like. Example client device 302 may be a laptop, a desktop, a mainframe computer, a smartphone, a personal digital assistant (PDA), an Internet of Things (IoT) device, or any other device capable of emailing a print job for printing. Example image forming apparatus 304 may be a printing device such as a dot-matrix printer, an inkjet printer, a laser printer, or the like capable of printing the print job on print media (e.g., papers). In addition, image forming apparatus 304 may include a multifunction printer (MFP), also known as multi-function device (MFD), or all-in-one (AIO) printer.

In another example, image forming apparatus 304 may be a cloud enabled or cloud ready printer. Cloud enabled printers may connect directly to a cloud (for instance, through the Internet) and may not require a computer setup. They can register directly with a cloud service on the Internet and may always be available. In yet another example, image forming apparatus 304 may be an HP e-Print-enabled printer. HP e-Print is a term used by Hewlett-Packard Company to describe a variety of printing technologies developed for mobile computing devices. HP e-Print may allow a user to print from virtually anywhere to an image forming apparatus that supports e-Print. Once enabled, e-Print assigns an email address to the image forming apparatus. To print, a user may send an email message including the document to be printed to the image forming apparatus's email address. For example, the user may print images, text documents, spreadsheets, presentations, photos, and the like using e-Print.

Example email print server 300 may include a processor 306, a memory 308 coupled to processor 306, and program 310 residing in memory 308 and executable by processor 306 to provide an email printing service. In an example, program 310 may receive an email message requesting a print job from client device 302. In an example, the email message may include an email address of image forming apparatus 304 in "To" field of the email message. Further, program 310 may determine image forming apparatus 304 to execute the print job from the email message.

Further, program 310 may send the print job to image forming apparatus 304 for execution. Upon sending the print job, program 310 may generate a first hyperlink indicating a status of the print job. In an example, the first hyperlink may be in an active state until the completion of the execution of the print job. Further, program may generate a reply email message by embedding a script that communicates with the first hyperlink.

Furthermore, program 310 may return the reply email message with the embedded script to a sender's email address (e.g., to client device 302) corresponding to the received email message. In one example, program 310 may return the reply email message including a visual interface in an email body of the email message. Example visual interface may indicate the status of the print job. In another example, program 310 may return the reply email message including a second hyperlink corresponding to a webpage. Example webpage may include a visual interface to indicate the status of the print job.

Further, program 310 may enable the embedded script to communicate with the first hyperlink to continuously fetch the status until a completion of execution of the print job. In other examples, program 310 may return the reply email message including at least one of:
  an option to initiate a reprint of the print job on image forming apparatus 304, and
  an option to watermark the print job and reprint the watermarked print job on image forming apparatus 304.

Figure 4A:
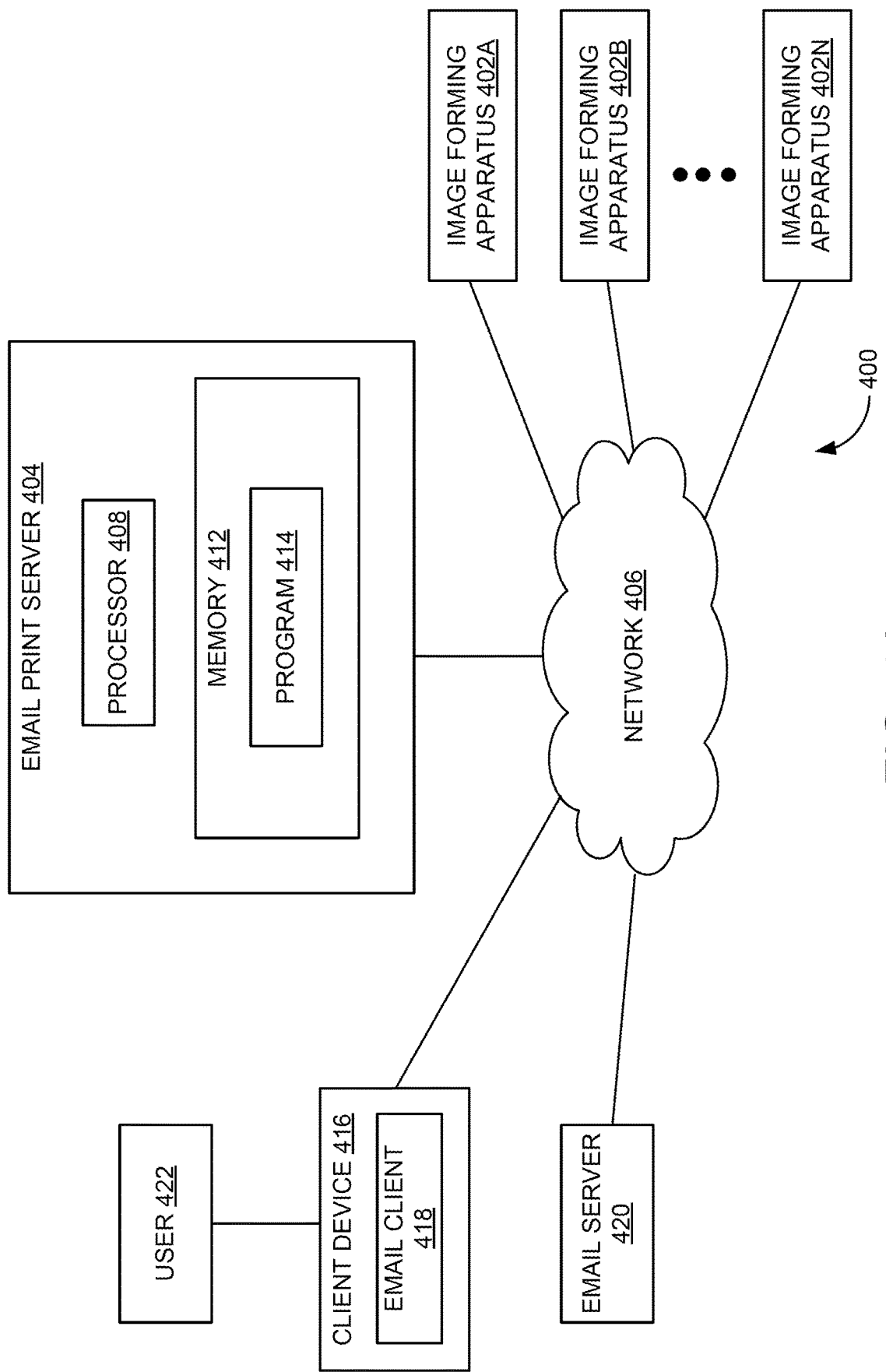
FIG. 4A is a block diagram of an example email print architecture, including an email print server to generate and send a reply email message with an embedded script that fetches a print job status.

FIG. 4A is a block diagram of an example email print architecture 400, including an email print server 404 to generate and send a reply email message with an embedded script that fetches a print job status. Further, email print architecture 400 may include image forming apparatuses 402A-402N connected to email print server 404 via a network 406 for executing print jobs. For example, email print server 404 may be a cloud-based server. In some examples, image forming apparatuses 402A-402N may be designed to provide multiple selectable features, such as, but not limited to duplexing (e.g., two-sided printing), color printing, multiple paper sizes, and the like. In some examples, each of image forming apparatuses 402A-402N may be assigned a unique email address, such that email print server 404 may receive the email message destined for a given unique email address of an image forming apparatus. Example network 406 may be implemented as the Internet. Further, email print architecture 400 may include multiple client devices (e.g., a client device 416), which enable users (e.g., a user 422) to generate the print jobs (e.g., the email message) using corresponding email clients (e.g., an email client 418) and transmit for executing the print job via an email server 420.

Example client device 416 can be implemented as a computer, including but not limited to a desktop or laptop personal computer, a mobile device, such as a smartphone, a personal digital assistant (PDA), or the like, that can communicate over network 406. In an example, client device 416 may include an email client 418 capable of sending and receiving email messages. In some examples, client device 416 and image forming apparatus 402A may be coupled to the same local area network (LAN) or coupled by a wide area network (WAN).

During operation, client device 416 may generate an email message (i.e., a print job) requesting that a particular document attached to the email message be printed using email client 418. Example email message may designate image forming apparatus 402A as a destination of the email message. The email message may include, for example, an email decoration that specifies printing parameters for image forming apparatus 402A. The email decoration can be implemented as a request identifier followed and/or proceeded by a request.

For example, the email decoration may be implemented as an email header subject field decoration, an email address field decoration, an email header optional field decoration or as an email tag (e.g., a separate attached file or body) decoration. The email decoration can include, for example, a request that the print job be executed in a specific way. Some examples may include specifying a particular size of paper to print the document and/or a number of copies to be printed (e.g., letter, A4, photo-sized, or the like). Other examples may include specifying a print quality (e.g., draft quality, black-and-white or color) for the print job, and/or printing photos. Still other examples may include specifying that a particular portion of the email message (e.g., a portion of a body of the print email message) be printed. Some examples include specifying that a particular portion (such as photographs) of the email message be omitted in the print job (e.g., a lean print request). In some examples, the email decorations may identify a particular network resource and/or service (e.g., a web service) that can provide content to be printed. As yet another example, the email decoration can specify a particular method of sending a response (e.g., a confirmation or denial) email. For instance, the email decoration could specify that response emails are sent via text message to a mobile phone.

In an example, client device 416 may connect to email server 420 for transmitting the email message. In some examples, email server 420 may be implemented as a Simple Mail Transfer Protocol (SMTP) server. In other examples, email server 420 may be a proprietary email server. As shown in FIG. 4A, email server 420 is illustrated for purposes of simplification of description. However, email server 420 may be a representative of multiple email servers to facilitate the delivery of the email message. In some examples, email server 420 can represent a mail submission agent (MSA), a mail transfer agent (MTA), a mail exchanger (MX), a mail delivery agent (MDA), and the like employed to deliver the email message. In such a scenario, the MSA may initially receive the email message from a mail user agent (MUA) of a sender of the email message. The MSA can forward the email message to an associated MTA. The MTA can provide the email message to an MX associated with a recipient of the email message. The MX can provide the email message to an MDA that stores the email message in a mailbox of the recipient of the email message. The email message can be retrieved from the mailbox by an MUA of the recipient. In some examples, some or all of the components represented as email server 420 may be integrated into email print server 404. For example, email print server 404 may include an MUA to send and receive email messages.

Upon receipt of the email message, email server 420 may generate an envelope for the email message by employing information (e.g., address field) in the email message. For purposes of simplification of description, the term "address field" can refer to a field in a header of the email message. Further email server 420 may provide the envelope and the email message to a delivery agent that can examine the envelope, and provide the email message in an appropriate mailbox, such as a mailbox of email print server 404. Furthermore, email print server 404 may detect the presence of the email message in the mailbox of email print server 404 and retrieve the email message. Thus, client device 416 may provide the email message that includes image forming apparatus 402A as a recipient of the email message and email print server 404 can receive and process the email message.

In response to reception of the email message, email print server 404 may convert the attachment in the email message into an instruction message, which can cause image forming apparatus 402A to print the attached document. Further, email print server 404 my route the print job to image forming apparatus 402A based on the received email message. For example, email print server 404 may send network messages to image forming apparatus 402A. The network message can cause image forming apparatus 402A to process the print job. Further, the network message may include a payload that provides commands to image forming apparatus 402A in a protocol native to image forming apparatus 402A, which can be referred to as an instruction message. For example, the instruction message may include printer command language (PCL) commands, portable document format (PDF) commands, HEWLETT PACKARD® Graphics Language (HPGL), commands, or the like. In some examples, email print server 404 may communicate via a communication protocol such as Transmission Control Protocol/Internet Protocol (TCP/IP), Internet Protocol version 6 (IPv6), or the like.

As shown in FIG. 4A, email print server 404 may include, for example, a memory 412 for storing computer executable instructions. Email print server 404 may also include, for example, a processor 408 (e.g., a processor core) for accessing memory 412 and executing computer executable instructions. Memory 412 can include a program 414. Memory 412 may be implemented, for example, as random-access memory, flash memory, a hard disk, or a combination thereof. During operation, program 414 may generate a hyperlink indicating a status of the print job and generate a reply email message by embedding a script that communicates with the hyperlink. Furthermore, program 414 may return the reply email message with the embedded script to a sender address of the received email message and enable the embedded script to communicate with the hyperlink to continuously fetch the status until a completion of execution of the print job. Example operation of program 414 is described in FIG. 4B.

Figure 4B:
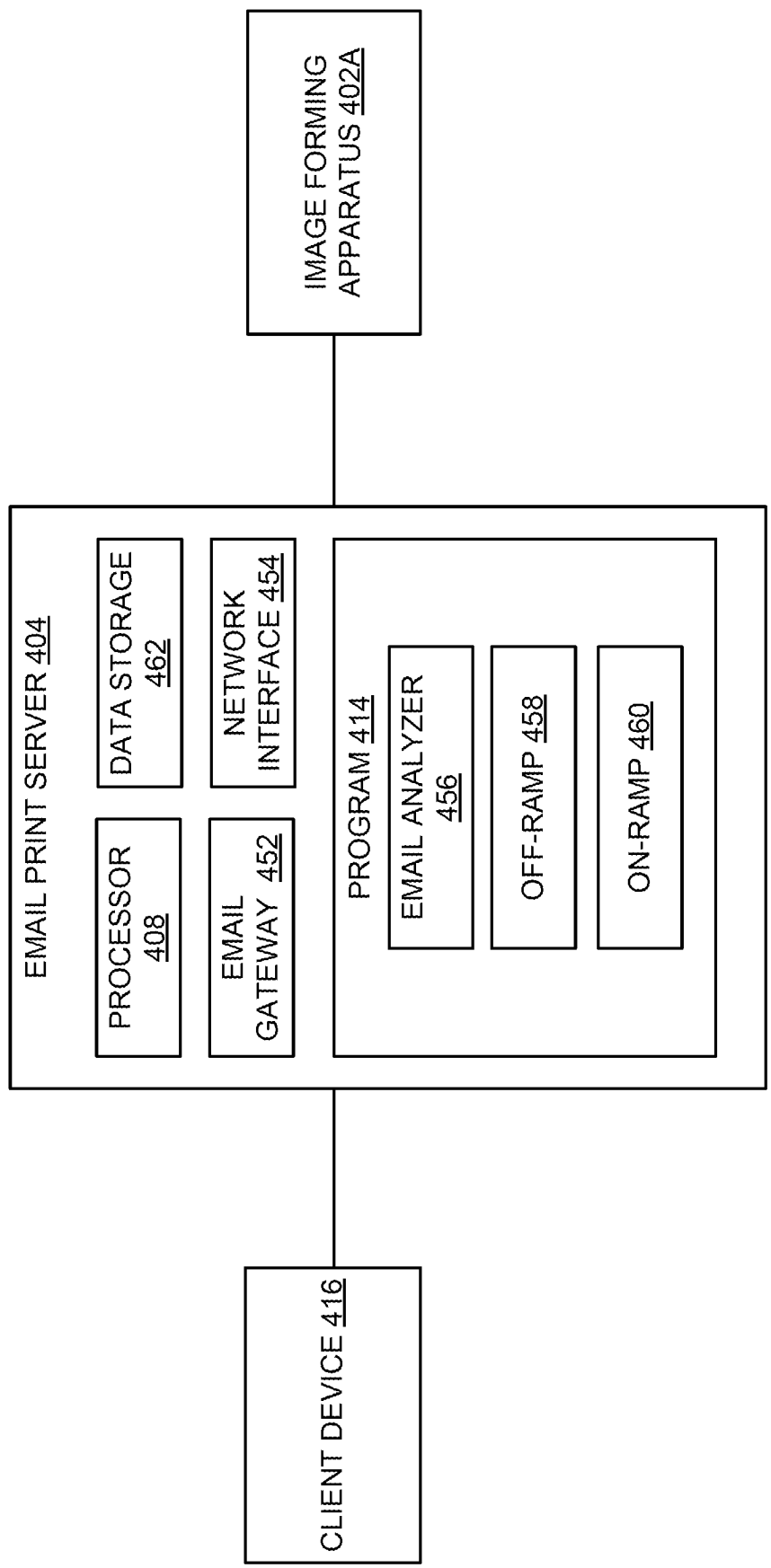
FIG. 4B is a block diagram of the example email print server of FIG. 4A, depicting additional features.

FIG. 4B is a block diagram of example email print server 404 of FIG. 4A, depicting additional features. For example, similarly named elements of FIG. 4B may be similar in structure and/or function to elements described with respect to FIG. 4A. In an example, email print server 404 may be coupled to network 406 (e.g., as shown in FIG. 4A) via a network interface 454, which may be implemented as a network interface card. Further, email print server 404 may include an email gateway 452 to receive an email message including a print job.

As shown in FIG. 4B, program 414 may include instructions corresponding to an email analyzer 456, an off-ramp 458, and an on-ramp 460. In an example, on-ramp 460 may receive the email message with the attached document to be printed. Further, on-ramp 460 may generate a short Uniform Resource Locator (URL) (i.e., a reference link) which may provide the print job status. Further, the short URL may be active till the print job is complete, thereafter it may start returning "Not Found" error, for instance.

Further, on-ramp 460 may provide the email message to email analyzer 456. Email analyzer 456 may evaluate the destination address field (e.g., addressee) of the email message and retrieve a record corresponding to image forming apparatus 402A from a data storage 462. Data storage 462 may include, for example, a database and/or a table that can store records of image forming apparatuses connected to network 406. Data storage 462 can be implemented, for example as volatile memory (e.g., RAM) or non-volatile memory (e.g. a hard disk and/or a flash drive). The record can include routing information (e.g., a network address) of image forming apparatuses in network 406. The printer record can further include data that characterizes printing capabilities of an identified image forming apparatus (e.g., 402A). In some examples, email analyzer 456 may examine a sender address field of the email message and the record to determine if the sender of the email message has authority to print to image forming apparatus 402A.

Further, email analyzer 456 can examine the capabilities of image forming apparatus 402A to determine if the print job can be executed on image forming apparatus 402A consistent with a command set forth in the email message. If email analyzer 456 determines that the print job cannot be executed by identified image forming apparatus 402A, email analyzer 456 can generate a denial email message that explains that the print job may not be executed, and the reason for not executing the print job (e.g., identified image forming apparatus 402A may not be able to print in color), and provide the denial email message to the sender of the email message. Conversely, if image forming apparatus 402A can execute the print job, email analyzer 456 may forward the email message to off-ramp 458.

In response, off-ramp 458 can query identified image forming apparatus 402A to determine if image forming apparatus 402A currently has the capability of executing the print job (e.g., paper loaded at image forming apparatus 402A). If off-ramp 458 determines that identified image forming apparatus 402A does not have the current capability of executing the print job, off-ramp 458 may generate and provide a denial email message to the sender of the email message in a manner similar to the denial message described with respect to email analyzer 456. If off-ramp 458 determines that image forming apparatus 402A does have the current capabilities to execute the print job, off-ramp 458 may convert the document attached to the email message, and/or a portion of the email message into a set of commands in a protocol native to image forming apparatus 402A (e.g., PCL, PDF, HPGL, etc.) consistent with the command set forth in the email message.

Further, off-ramp 458 may send the set of commands as an instruction message to image forming apparatus 402A over network 406, thereby causing image forming apparatus 402A to process the set of commands. The processing of the set of commands can result, for example, in an execution of the print job. The execution of the print job can include, for example, printing the document attached to email message and/or a portion of the email message in a manner consistent with the command set forth in the email message.

Furthermore, off-ramp 458 may receive a status message from image forming apparatus 402A. In response to the status message, off-ramp 458, in communication with on-ramp 460, can provide a reply email message to the sender of the email message. The reply email message can be implemented, for example, as a confirmation email message, as described herein. Thus, the reply email message provides the sender of the email message an indication of a status of the print job corresponding to the execution of the print job requested by the email message. In an example, the reply email message may be encoded in Hypertext Markup Language (HTML) to include a script. Further, the script may connect to the short URL to fetch the print job status and will continuously update the print job status. Once the print job is completed, the short URL may become inactive.

In some examples, the functionalities described herein, in relation to instructions to implement functions of email analyzer 456, off-ramp 458, on-ramp 460, and any additional instructions described herein in relation to the storage medium, may be implemented as engines or modules including any combination of hardware and programming to implement the functionalities of the modules or engines described herein. The functions of email analyzer 456, off-ramp 458, and on-ramp 460 may also be implemented by a processor. In examples described herein, processor may include, for example, one processor or multiple processors included in a single device or distributed across multiple devices.

The above-described examples are for the purpose of illustration. Although the above examples have been described in conjunction with example implementations thereof, numerous modifications may be possible without materially departing from the teachings of the subject matter described herein. Other substitutions, modifications, and changes may be made without departing from the spirit of the subject matter. Also, the features disclosed in this specification (including any accompanying claims, abstract, and drawings), and/or any method or process so disclosed, may be combined in any combination, except combinations where some of such features are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus. In addition, the terms "first" and "second" are used to identify individual elements and may not meant to designate an order or number of those elements.

The present description has been shown and described with reference to the foregoing examples. It is understood, however, that other forms, details, and examples can be made without departing from the spirit and scope of the present subject matter that is defined in the following claims.

What is claimed is:

1. A non-transitory machine-readable storage medium encoded with instructions that, when executed by a processor of a computing device, cause the processor to:
   transmit an email message addressed to an email address associated with an image forming apparatus, the email message including content to be printed;
   receive a confirmation email message from an email print server in response to the transmission of the email message, wherein the confirmation email message comprises a status update mechanism; and
   execute the status update mechanism to:
      fetch a print job status indicating a progress of printing the content from the email print server; and
      display the fetched print job status in the confirmation email message.

2. The non-transitory machine-readable storage medium of claim 1, wherein the status update mechanism is implemented using a script that is embedded in the email message.

3. The non-transitory machine-readable storage medium of claim 2, wherein the script is Javascript.

4. The non-transitory machine-readable storage medium of claim 1, wherein instructions to execute the status update mechanism comprise instructions to:
   connect to a reference link in the email print server to fetch the print job status indicating a state of progress of printing the content; and
   sequentially update an email body of the email message with the fetched print job status until a completion of printing of the content.

5. The non-transitory machine-readable storage medium of claim 1, wherein the confirmation email message comprises a hyperlink corresponding to a webpage that is to be displayed in a web browser upon activating the hyperlink, the webpage displaying the fetched print job status.

6. A non-transitory machine-readable storage medium encoded with instructions that, when executed by a processor of a computing device, cause the processor to:
   transmit an email message addressed to an email address associated with an image forming apparatus, the email message including a document to be printed as an attachment;
   receive a confirmation email message from an email print server in response to the transmission of the email message, wherein the confirmation email comprises a script and a hyperlink corresponding to a webpage;
   display the webpage including a visual interface upon activation of the hyperlink; and
   execute the script to:
      fetch, from the email print server, a print job status indicating a progress of printing the document; and
      update the visual interface with the fetched print job status.

7. The non-transitory machine-readable storage medium of claim 6, wherein instructions to execute the script comprise instructions to:
   connect to a reference link in the email print server to fetch the print job status, wherein the reference link is in an active state until a completion of printing of the document.

8. The non-transitory machine-readable storage medium of claim 6, wherein the script is an Asynchronous JavaScript and XML (AJAX) script.

9. The non-transitory machine-readable storage medium of claim 6, wherein the visual interface comprises a set of status indicators, each status indicator indicating a different state corresponding to the progress of printing the document.

10. The non-transitory machine-readable storage medium of claim 9, wherein instructions to update the visual interface with the fetched print job status comprise instructions to:
    sequentially highlight the set of status indicators based on the progress of printing of the document.

11. An email print server comprising:
    a processor;
    a memory coupled to the processor; and
    a program residing in the memory and executable by the processor to provide an email printing service, wherein the program is to:
       receive an email message requesting a print job;
       determine an image forming apparatus to execute the print job from the email message;
       send the print job to the image forming apparatus for execution;
       generate a first hyperlink indicating a status of the print job;
       generate a reply email message by embedding a script that communicates with the first hyperlink;
       return the reply email message with the embedded script to a sender's email address corresponding to the received email message; and
       enable the embedded script to communicate with the first hyperlink to continuously fetch the status until a completion of execution of the print job.

12. The email print server of claim 11, wherein the first hyperlink is in an active state until the completion of the execution of the print job.

13. The email print server of claim 11, wherein the program is to:
    return the reply email message including a visual interface in an email body of the email message, wherein the visual interface is to indicate the status of the print job.

14. The email print server of claim 11, wherein the program is to:
    return the reply email message including a second hyperlink corresponding to a webpage, wherein the webpage comprises a visual interface to indicate the status of the print job.

15. The email print server of claim 11, wherein the program is to:
    return the reply email message including at least one of:
       an option to initiate a reprint of the print job on the image forming apparatus; and an option to watermark the print job and reprint the watermarked print job on the image forming apparatus.

* * * * *